(12) United States Patent
Hülser

(10) Patent No.: US 7,257,477 B2
(45) Date of Patent: Aug. 14, 2007

(54) METHOD FOR CONTROLLING A PRIME MOVER FOR A VEHICLE

(75) Inventor: Holger Hülser, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/577,918

(22) PCT Filed: Oct. 28, 2004

(86) PCT No.: PCT/AT2004/000373

§ 371 (c)(1),
(2), (4) Date: Aug. 21, 2006

(87) PCT Pub. No.: WO2005/042949

PCT Pub. Date: May 12, 2005

(65) Prior Publication Data

US 2007/0067071 A1    Mar. 22, 2007

(30) Foreign Application Priority Data

Nov. 3, 2003    (AT) ............................... 760/2003 U

(51) Int. Cl.
*G06F 7/00*    (2006.01)
(52) U.S. Cl. .......................................... 701/54; 701/53

(58) Field of Classification Search .................. 701/51, 701/53, 54, 55, 56, 103, 101, 110; 477/86, 477/90, 166; 192/54.1
See application file for complete search history.

(56) References Cited

U.S. PATENT DOCUMENTS

| 5,890,992 | A * | 4/1999 | Salecker et al. ............... 477/86 |
| 6,386,351 | B1 * | 5/2002 | Salecker et al. ........... 192/54.1 |
| 2003/0110875 | A1 | 6/2003 | Brandt | |

FOREIGN PATENT DOCUMENTS

| DE | 10026332 | 7/2001 |
| DE | 10302601 | 9/2003 |
| EP | 1074423 | 2/2001 |
| EP | 1248021 | 10/2002 |

* cited by examiner

*Primary Examiner*—Richard M. Camby
(74) *Attorney, Agent, or Firm*—Dykema Gossett PLLC

(57) ABSTRACT

The invention relates to a method for controlling a prime mover for a vehicle, particularly a combustion engine, comprising at least one engine control unit and at least one additional controller in the drive train. According to the invention, command variable demands are sent from the controller to the engine control unit, and the transfer function of the prime mover is at least partially depicted by means of a predetermined approximated transfer function of the prime mover.

12 Claims, 3 Drawing Sheets

Stand der Technik

METHOD FOR CONTROLLING A PRIME MOVER FOR A VEHICLE

The invention relates to a method for controlling a prime mover for a vehicle, especially a combustion engine, comprising at least one engine control unit and at least one additional controller in the drive train, with command variable demands being sent by the controller to the engine control unit, and with the transfer function of the prime mover being at least partially depicted by means of a predetermined approximated transfer function of the prime mover.

In modern motor vehicles, requirements are placed on command variables such as the torque to be supplied by the combustion engine not only by the engine control unit but also by other controllers. For this purpose it is common practice that the other controllers send a request to the engine control unit via a data connection line, e.g. by way of CAN (Controller Area Network). This request can either be the demand for a torque or also the demand for modification of the torque which the engine would supply without such external request.

Such demands on the torque can come from a transmission controller for example in order to positively influence the torque supplied by the combustion engine during gear-shifting within the terms of driving comfort and low wear and tear. A controller which monitors and regulates the driving dynamics of the vehicle (e.g. ESP—Electronic Stability Program) makes such requests for torque to the controller of the combustion engine in driving situations which are critical with respect to the driving dynamics.

In the case of such external requests for torque which are also known as torque interventions, it is always necessary to also take into account the limited dynamics with which the system of engine control unit and internal combustion engine can realize such torque interventions. The combustion engine will usually follow a torque intervention only, after a delay time depending on the operating point, and also the gradient with which the torque can be increased or reduced is subject to maximum dynamics depending on the operating point. If these limited dynamics are not taken into account, considerable losses in convenience will ensue.

Current controllers for the transmission and driving dynamics internally reflect such transfer behavior of the system consisting of engine control unit and combustion engine to a certain extent in order to thus enable the modification of the torque intervention in a suitable fashion. In known realizations, the approximated transfer function of the combustion engine is stored at least partly in the controllers for the transmission or driving dynamics in order to compensate the real transfer behavior of the combustion engine at least in part. This approximated transfer function can also be stored implicitly by considering characteristics such as parameters, characteristic curves, characteristic maps or the like.

This can mean concretely for example that during gear-shifting process the transmission controller needs to demand a torque intervention from the engine control unit earlier than actually required in order to compensate the delay time of the combustion engine.

On the one hand, the at least partial and often implicit storage of the approximated transfer function of the combustion engine in the transmission controller leads to a considerable adjustment effort in the installation of the same system consisting of transmission and transmission controller in another vehicle with a different combustion engine.

On the other hand, despite this considerable adjustment effort the approximated transfer function of the combustion engine in a controller other than the engine control unit can be known only very imprecisely (i.e. the approximation is only very rough) because the transfer function of the engine depends on many engine-internal operating parameters which are not known outside of the engine control unit. In addition to the current speed and current torque of the combustion engine, the temperature of the engine, the operating state of a turbocharger that may be present, the setting of an exhaust gas recirculation valve that may be present and many further engine-internal operating parameters have a considerable influence on the dynamics and thus also on the transfer function of the combustion engine.

Since thus the transfer function of the combustion engine is only partly known in the transmission controller, it can therefore only partly be compensated by a respective modification of the command variable demand. The residual shares that are thus not compensated lead to a different operating-point-dependent behavior of the combustion engine on the torque intervention of the transmission controller and thus to a reduced gear-shifting comfort and increased wear and tear of the transmission and/or clutch.

At the current state of the art, the control of the combustion engine is not able to optimally implement an external torque intervention because a forecast of the further progress of the required torque is not known. If there were knowledge of the expected progress of the torque, it would be possible in many cases to set engine-internal parameters such as advance angle, position of a variable turbocharger, positions of a variable exhaust gas recirculation valve or the like in a manner that would lower fuel consumption and emissions and/or increase driving comfort and dynamics.

From DE 100 26 332 A 1 a method is known for the coordinated control of a vehicle engine and a clutch by means of drive train control during the change of a transmission ratio, with the engine and the clutch each being associated with at least one actuator with which a setting of a setpoint value for an engine torque or a clutch torque occurs via the drive train control. For the purpose of coordinated triggering of clutch and engine, setpoint values for the clutch torque and engine torque are adjusted directly by reference to the detected operating parameters and operating states, partly by predicative engine control.

It is the object of the present invention to develop a method for controlling a prime mover with which command variable demands can be implemented optimally.

This is achieved in accordance with the invention in such a way that the engine control unit calculates at least one parameter of the approximated transfer function of the prime mover and sends the same to the controller, and that in the controller the approximated transfer function is reconstructed at least partly on the basis of the at least one calculated parameter and the command variable demands are modified on the basis of the approximated transfer function which is reconstructed at least in part. The modified command variable demands are sent to the engine control unit. The demanded command variable can be a variable of the group of torque, speed, vehicle acceleration, vehicle speed or output. As a result of the fact that relevant parameters of the approximated transfer function of the prime mover are calculated within the engine control unit and these parameters are supplied to the controller, the approximated transfer function can be determined at least partly with parameters reflecting the real operating situation. The calculation of the parameters can occur continuously or discontinuously in fixed time intervals (e.g. every 10 ms) or according to a time raster which is defined by the rotation of the drive shaft of the prime mover. The calculated parameters for the approximated transfer function can be delay time, phase displacement, damping, characteristic frequency, maximum gradient in increase of the command variable, maximum gradient in reduction of the command variable or the like.

The engine control unit thus regularly calculates relevant parameters of the approximated transfer function of the prime mover and provides this information to the additional controllers in the drive train at certain times via a data connecting line (e.g. CAN). These additional controllers can then at least partly reconstruct the approximated transfer function on the basis of these parameters with very little effort and thus suitably modify the command variable intervention. The additional controllers in the drive train of the vehicle can also consider the approximated transfer function of the prime mover in an implicit manner, i.e. by means of characteristics such as parameters, characteristic curves, characteristic maps or the like.

It can further be provided that at least one further parameter of the command variable demand from the group of setpoint value of the command variable after the end of the command variable intervention, duration of the command variable intervention, sign of the current command variable gradient and information on the purpose of the command variable intervention is sent by the at least one additional controller to the engine control unit.

The information on the purpose of the command variable intervention contains information whether the same occurred for the purpose of increasing vehicle security or for increasing comfort. If the command variable intervention is used for increasing vehicle security (e.g. by a driving security system such as EPS), its realization can be improved considerably in such a way that in such a case exhaust gas limit values and load values may be exceeded for short period of time, which is not permitted in the case of command variable interventions used alone for increasing comfort.

It is provided for in a further embodiment of the invention that depending on further parameters the actuating paths in the engine control unit are influenced, preferably on the basis of information on the purpose of the command variable intervention. The efficiency of the prime mover can be reduced at a very short torque intervention in the reducing direction for example in order to enable a very rapid increase of the engine torque after the end of the torque intervention. It can further be provided in a prime mover configured as a combustion engine that during the command variable intervention the filling (=oxygen mass) is set in at least one cylinder of the combustion engine in such a way that it fits optimally the setpoint value of the command variable after the end of the command variable intervention.

The transfer of the parameters advantageously occurs via a data connecting line, e.g. via CAN (Controller Area Network).

It is especially advantageous when the parameters are transferred in a standardized form by all engine control units installed in motor vehicles. The adaptation effort with respect to the control technology can be minimized by a generally recognized transfer mode between engine control unit and additional controllers.

By transferring the most relevant parameters of the approximated transfer function to the additional controllers in the drive train, no adaptation work or only very little such work is required in such other controllers concerning a modified prime mover. Moreover, the determination of the approximated transfer function in the controller of the prime mover allows considering a large number of engine-internal variables such as temperature, operating state of turbocharger or the like, and therefore leads to a considerable increase in the quality with an at least partial determination of the approximated transfer function. By increasing this quality, the gear-shifting comfort can be increased considerably in the case of a torque intervention for example and wear and tear of clutch and/or transmission can be reduced.

Special advantages are obtained when several controllers are built into the drive train of a motor vehicle which are to intervene in a command variable of the prime mover. This can concern a transmission controller and a driving dynamics controller for example. In this case, the unavoidable additional effort required in the engine control unit for determining the approximated transfer function and its relevant parameters is offset by the omission of the adaptation requirements in the transmission and driving dynamics controllers, which thus considerably increases the advantage.

The invention is explained below in closer detail by reference to the schematic drawings, wherein.

Figure 1:
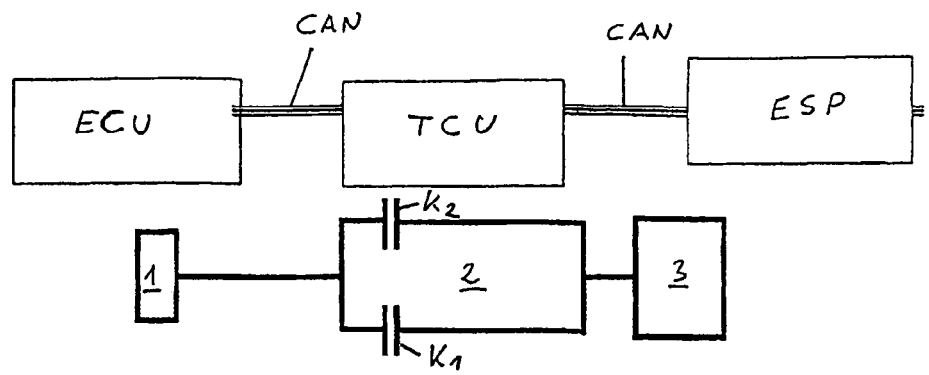
FIG. 1 shows the system configuration.

FIG. 1 shows the system configuration of a control system for a prime mover formed by a combustion engine 1 which is connected via a transmission unit 2 comprising two clutches $K_1$, $K_2$ with a driven shaft 3. The number of clutches of the transmission unit is irrelevant for the method in accordance with the invention. The combustion engine 1 is an electronic engine control unit ECU. The transmission 2 is associated with an electronic controller TCU for transmission and clutch, and the driven shaft 3 is associated with a driving dynamics controller ESP. The driving dynamics controller ESP and the transmission controller TCU are in connection with the electronic engine control unit ECU via data connection lines CAN. The controllers TCU and ESP can send command variable demands to the engine control unit via the data connection lines CAN. The command variable demand can either be the demand for a torque or also the demand for modification of the torque that the combustion engine would supply without said external demand. Such demands on the torque can come from a transmission controller TCU in order to influence the torque supplied by the combustion engine 1 in a positive way within the terms of driving comfort and low wear and tear during a gear-shifting process. The driving dynamics controller ESP which monitors and regulates the driving dynamics of the vehicle will make such torque demands to the electronic control unit ECU of the combustion engine 1 in driving situations which are critical from a driving dynamics standpoint. Other variables such as speed, vehicle acceleration, vehicle speed, output and the like can be considered as command variables.

Figure 2:
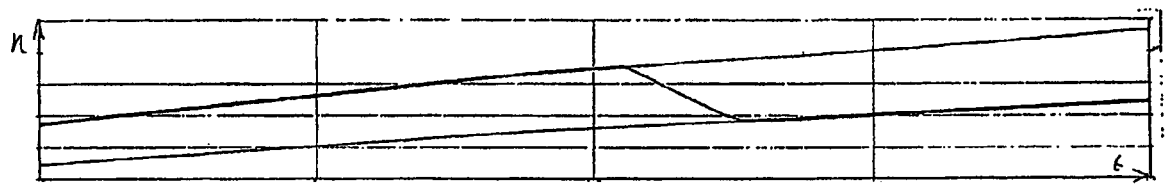
FIG. 2 to FIG. 4 shows the speed, torque and vehicle acceleration during a gear-shifting process without considering the transfer function of the prime mover.
Figure 3:
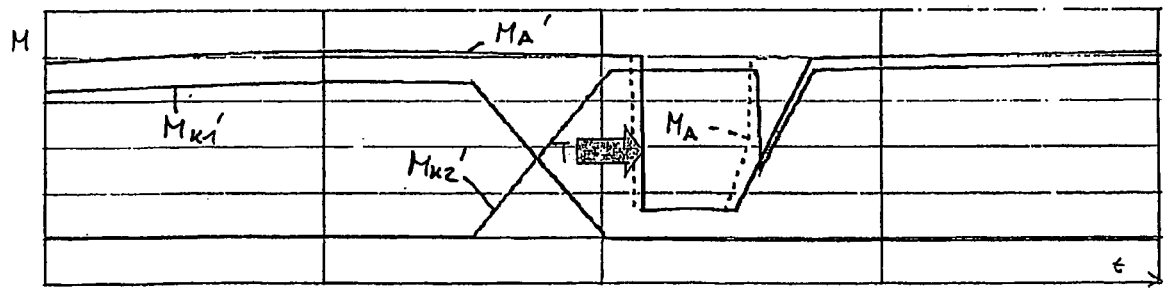
Figure 4:
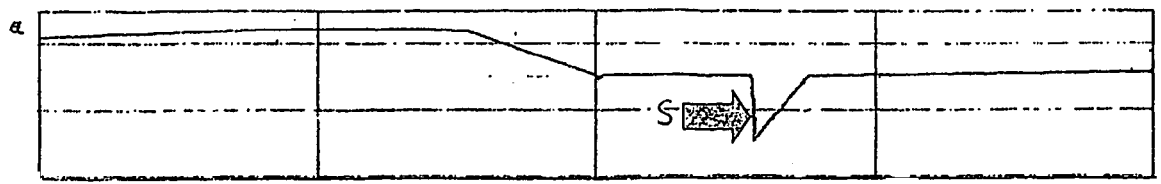

FIG. 2, FIG. 3 and FIG. 4 show speed n, engine torque M and acceleration a during an upshifting process, entered over time t, with $M_4'$ representing the engine torque and $M_{K1}'$ and $M_{K2}'$ the coupling torque transferred via the two clutches $K_1$, $K_2$. As is shown in FIGS. 2 to 4, the combustion engine 1 will generally follow a torque intervention only after a delay time depending on the operating point, and also the gradient with which the torque can be increased or reduced is subject to maximum dynamics dependent upon the operating point. This time delay in the engine torque M is designated in FIG. 3 with reference numeral T. The time delay T causes a drop in the acceleration behavior, as is indicated in FIG. 4 with reference numeral S. This has a disadvantageous effect on the gear-shifting comfort.

Figure 5:
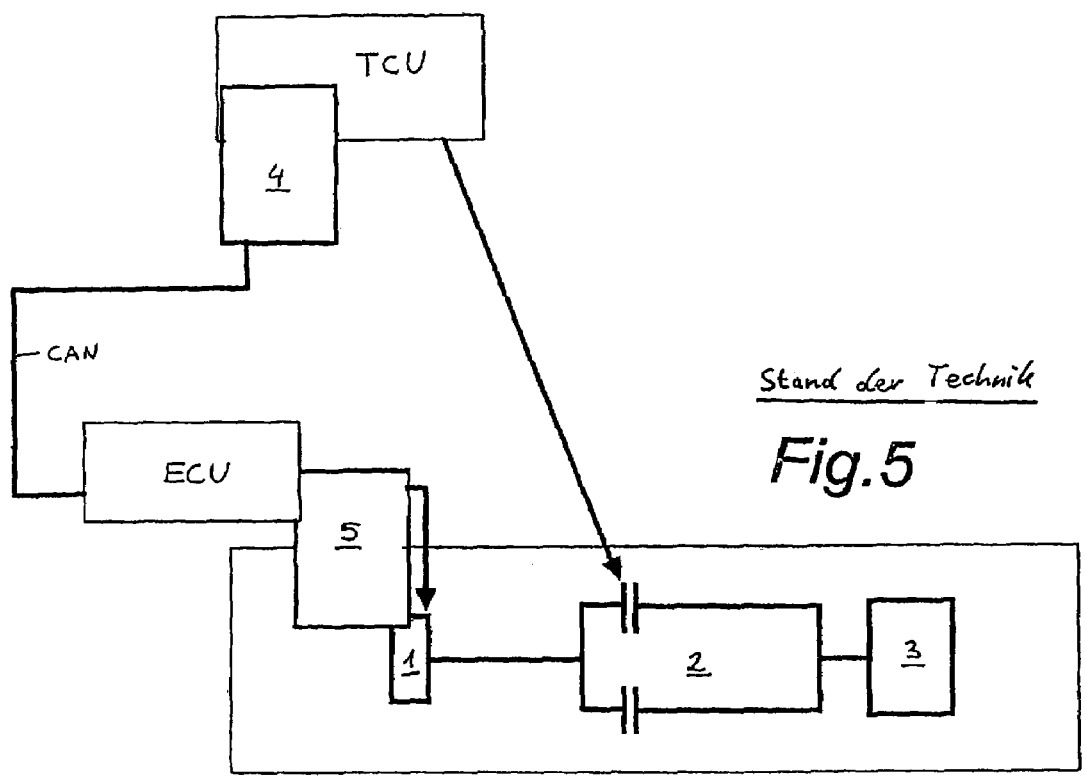
FIG. 5 shows a drive train interface according to the state of the art.

The known control system as shown in FIG. 5 comprises an electronic engine control unit ECU for the internal combustion engine 1 and a transmission controller TCU for the transmission unit 2. In the transmission controller TCU, the transfer behavior of the system consisting of electronic engine control unit ECU and combustion engine 1 is depicted internally to a certain extent in order to enable the modification of the torque intervention in a suitable manner. The approximated transfer function 4 of the combustion engine 1 is stored at least partly in the transmission controller TCU in order to compensate at least partly the real transfer function 5 of the combustion engine 1.

The real transfer function 5 of the combustion engine characterizes the dynamic behavior of the command variable (e.g. torque) relative to the command variable demands.

The real transfer function 5 is stored in approximated form 4 in the transmission controller TCU. In the frequency range it can be written in the following form in approximation by a transfer behavior of $2^{nd}$ order:

$$G(s) = \frac{M\_ist(s)}{M\_soll(s)} = \frac{omega\_0^2}{s^2 + 2 \cdot D \cdot omega\_0 \cdot s + omega\_0^2} \cdot e^{-T \cdot s} \quad (1)$$

Here s is the complex variable, M_ist(s) represents the Laplace transform of the initial value of the command variable, M_soll(s) represents Laplace transform of the command variable demand, T a delay time, D a damping and omega_0 a characteristic radian frequency. The values of T, D and omega_0 usually depend on the operating point of the combustion engine.

The command variable intervention can now be modified with knowledge of the approximated transfer function G(s) by a suitable function R(s) in such a way that the transfer function 5 of the combustion engine is substantially compensated. The finding of the suitable function R(s) for the approximated transfer function G(s) is a known problem of automatic control theory.

Said approximated transfer function 4 can also be stored implicitly by taking into account characteristics such as parameters, characteristic curves, characteristic maps or the like. It may occur that during a gear-shifting process the transmission controller TCU must demand a torque intervention already at an earlier time than actually required form the engine control unit ECU in order to compensate the delay time of the combustion engine 1. The control of the combustion engine 1 is often unable to optimally implement an external torque intervention, because a forecast of the further progress of the demanded torque is not known. A further disadvantage of this known system is that the partial and often implicit storage of the approximated transfer function 4 of the combustion engine 1 in the transmission controller TCU represents a considerable adaptation effort in the installation of the transmission 2 and the transmission controller TCU in another vehicle with another combustion engine 1.

On the other hand, the approximated transfer function 4 of the combustion engine 1 can never be known very precisely in a controller other than the engine control unit ECU despite this considerable adaptation effort (i.e. the approximation is very rough), because the transfer function 5 of combustion engine 1 depends on numerous engine-internal operating parameters which are not known outside of the engine control unit ECU. In addition to current speed n and current torque M of the combustion engine, the temperature of the combustion engine 1, the operating state of a turbocharger that may be present, the setting of an exhaust gas recirculation valve that may be present and many further engine-internal operating parameters thus have a considerable influence on the dynamics and thus on the transfer function 5 of the internal combustion engine 1. Since thus the approximated transfer function 4 as stored in the transmission controller TCU approximates the real transfer function 5 of the combustion engine only very incompletely, the transfer function 5 of the internal combustion engine 1 can also only be partly compensated by a modification of the command variable demand. The thus non-compensated residual shares lead to a different behavior of the combustion engine 1 on the torque intervention of the transmission controller TCU, which different behavior depends on the operating point, and thus to a reduce gear-shifting comfort and increased wear and tear of the transmission unit 2.

Figure 6:
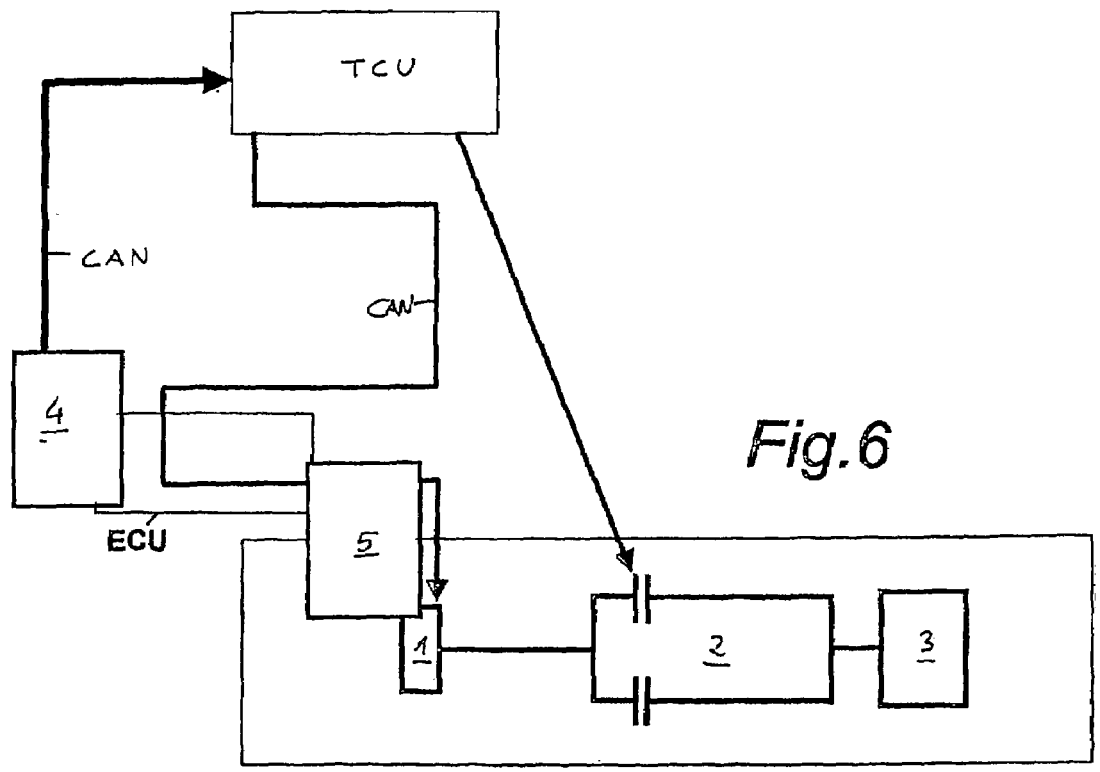
FIG. 6 shows a drive train interface according to the invention.

In accordance with FIG. 6, these disadvantages can be avoided or at least considerably reduced when relevant parameters of the approximated transfer function 4 are calculated in the electronic engine control unit ECU and are provided via the data connection line CAN at certain times to the other control devices in the drive train, e.g. a transmission controller TCU. Such other control devices can then reconstruct at least in part the approximated transfer function 4 on the basis of these parameters with very little effort and thus suitably modify the torque intervention. In this respect, the other controllers in the drive train of the motor vehicle can also consider the approximated transfer function 4 of the combustion engine 1 in an implicit manner, this means by way of characteristics such as parameters, characteristic curves, characteristic maps or the like.

The relevant parameters of the approximated transfer function can be transferred advantageously in a standardized form by all engine control units ECU which are built into motor vehicles.

Figure 7:
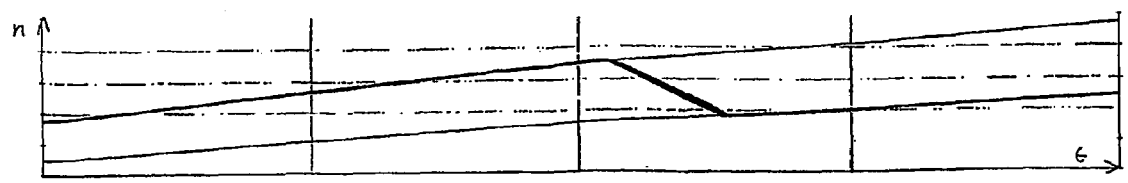
FIG. 7, FIG. 8 and FIG. 9 show speed, torque and vehicle acceleration when using the method in accordance with the invention.
Figure 8:
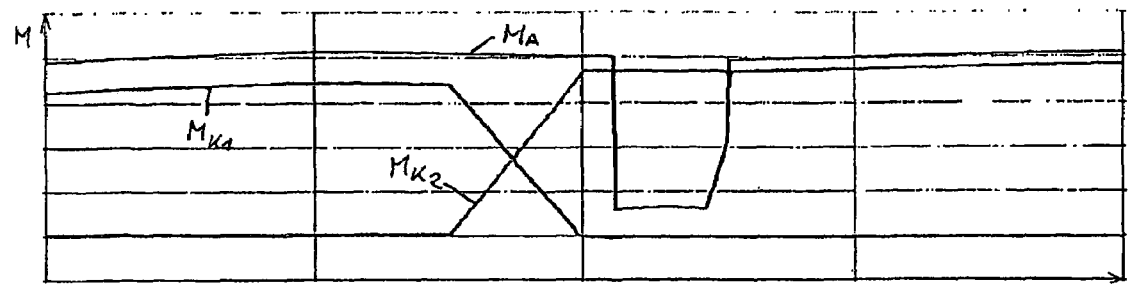
Figure 9:
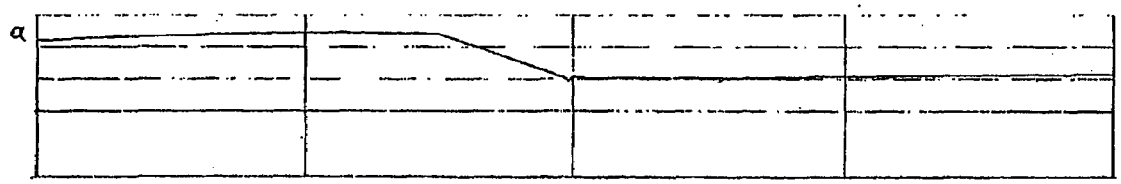

By transferring the relevant parameters of the approximated transfer function 4 to the other controllers TCU, ESP or the like in the drive train, there is no need or only very little need for adjustment to a changed combustion engine 1. Moreover, the determination of the approximated transfer function 4 in the electronic engine control unit ECU of the combustion engine 1 allows considering a large number of engine-internal parameters such as temperatures, operating state of a turbocharger, etc., thus leading to a considerable increase in the quality of the approximated transfer function 4. By increasing this quality, the gear-shifting comfort can be improved considerably in the case of a torque intervention by the transmission controller TCU and wear and tear of the clutch and/or transmission can be reduced, as is shown in FIGS. 7 to 9. The optimal control of the engine dynamics without any temporal delay of the engine reaction during the gear-shifting process as shown in FIG. 8 is caused by the determination of the approximated transfer function 4 in the engine control unit ECU. The engine torque $M_A$ as achieved by the method in accordance with the invention is shown in a broken line in FIG. 3 for comparison purposes. FIG. 9 shows that there is no drop in the acceleration a any more and that therefore the gear-shifting comfort is improved substantially.

Further advantages of the method are obtained when several controllers such as a transmission controller TCU and a driving dynamics controller ESP are installed in the drive train of a motor vehicle, which controllers intervene in the torque of the combustion engine 1. In this case, the unavoidable additional effort in the engine control unit ECU for determining the approximated transfer function 4 and its relevant parameters is offset by the omission of the adaptation effort in the transmission and driving dynamics controllers TCU and ESP, which thus considerably improves the advantage.

The parameters of the approximated transfer function 4 as calculated by the electronic engine control unit ECU can be delay time, phase displacement, damping, characteristic frequency, maximum gradient in increase of the command variable, maximum gradient in reduction of the command variable or the like.

In addition, further parameters of torque demand can be determined by the demanding electronic controller such as setpoint torque after the end of the torque intervention, duration of torque intervention, sign of current torque gradient or information on the purpose of the torque intervention. The information on the purpose of the torque intervention can considerably improve its realization because in the case of a torque intervention for increasing the vehicle security (e.g. by a vehicle security system such as ESP), both exhaust gas limit values as well as load values may be exceeded for a short while, which is not permitted in torque interventions for improving comfort during gear-shifting.

Depending on such further parameters, the actuating paths in the electronic engine control unit ECU can be influenced for optimal implementation of the torque intervention. Thus it is possible for example to intentionally deteriorate the efficiency of the combustion engine in the case of a very short torque intervention in a reducing direction, e.g. by changing the valve control, the injection time or the ignition time. Moreover, the filling (=oxygen mass) in the cylinder can be set during the torque intervention in such a way for example that it optimally matches the setpoint torque after the end of the torque intervention.

The described method can not only be used for vehicles with combustion engines, but also for vehicles with electric prime movers.

The claims filed with the application are phrasing proposals without prejudice to achieving a further patent protection. The applicant reserves the right to claim further features disclosed previously only in the description and/or drawings.

References back in the sub-claims refer to further embodiments of the subject matter of the main claim by features of the respective sub-claim. They shall not be understood as a waiver to achieving an independent respective protection for the features of the sub-claims which refer back.

The subject matters of such sub-claims also form independent inventions which have a configuration which is independent of the subject matters of the preceding sub-claims.

The invention is also not limited to the embodiment(s) of the description. Rather, numerous changes and modifications are possible within the scope of the invention, especially such variants, elements and combinations and/or materials which are inventive for example by combination or modification of individual features and elements or method steps as described in the general description and claims and contained in the drawings, and lead to a new subject matter or new method steps or sequences of method steps through combined features, insofar as they relate to production, testing and working methods.

The invention claimed is:

1. A method for controlling a prime mover for a vehicle, comprising at least one engine control unit and at least one additional controller in the drive train, with command variable demands being sent by the controller to the engine control unit, and with a transfer function of the prime mover being at least partially depicted by means of a predetermined approximated transfer function of the prime mover, wherein the engine control unit calculates at least one parameter of the approximated transfer function of the prime mover and sends the same to the controller, and wherein in the controller the approximated transfer function is reconstructed at least partly on a basis of the at least one calculated parameter and the command variable demands are modified on the basis of the approximated transfer function which is reconstructed at least in part.

2. The method according to claim 1, wherein the calculation of the at least one parameter of the approximated transfer function occurs continuously.

3. The method according to claim 1, wherein the calculation of the at least one parameter of the approximated transfer function occurs discontinuously.

4. The method according to claim 1, wherein the at least one parameter is chosen from the group of delay time, damping, characteristic frequency, phase displacement, maximum gradient in increase of the command variable, and maximum gradient in reduction of the command variable.

5. The method according to claim 4, wherein at least one further parameter from the group of setpoint value of the command variable after an end of a command variable intervention, duration of the command variable intervention, sign of the current command variable gradient and information on the purpose of the command variable intervention is sent by the at least one additional controller of the engine control unit in addition to the command variable demands.

6. The method according to claim 5, wherein depending on the further parameters the actuating paths in the engine control unit are influenced.

7. The method according to claim 6, wherein the actuating paths are influenced on the basis of information on the purpose of the command variable intervention.

8. The method according to claim 6, wherein the operating parameters are set in a purposeful manner in the direction towards deterioration of the efficiency in the case of a very short command variable intervention in a reducing direction.

9. The method according to claim 6, wherein during the command variable intervention the filling in at least one cylinder of the combustion engine is set in such a way that it matches optimally a setpoint value of the command variable after the end of the command variable intervention.

10. The method according to claim 1, wherein the parameters are transferred via a data connection line.

11. The method according to claim 1, wherein at least the parameters of the engine control unit to the controller are transferred in a standardized form.

12. The method according to claim 1, wherein the command variable is chosen from the group of torque, speed, vehicle acceleration, vehicle speed or output.

* * * * *

UNITED STATES PATENT AND TRADEMARK OFFICE
Certificate

Patent No. 7,257,477 B2

Patented: August 14, 2007

ON petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Holger Hülser, Graz (AT); Robert Fischer, Graz (AT); Alois Danninger, Kapfenberg (AT); and Michael Stolz, Graz (AT).

Signed and Sealed this Fifth Day of July 2011.

THOMAS G. BLACK
*Supervisory Patent Examiner*
Art Unit 3661
Tecnology Center 3600